Figure 1:
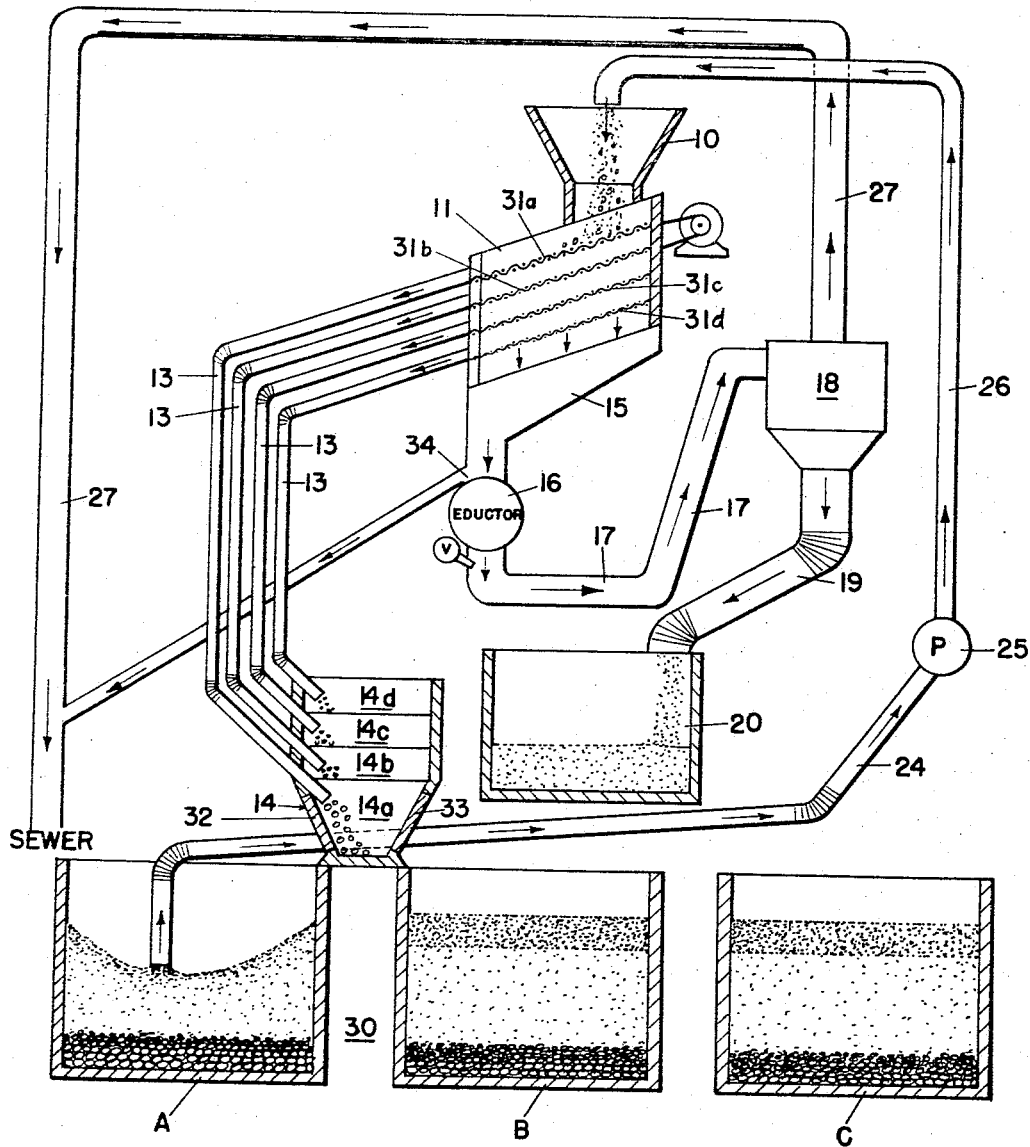

Aug. 1, 1967    D. R. RANGE    3,333,694

METHOD OF RESETTING FILTER BEDS

Filed April 2, 1965

INVENTOR.
DELL R. RANGE

BY Charles L. Lovercheck
attorney

United States Patent Office 3,333,694
Patented Aug. 1, 1967

3,333,694
METHOD OF RESETTING FILTER BEDS
Dell R. Range, 1902 Brandes St., Erie, Pa. 16503
Filed Apr. 2, 1965, Ser. No. 445,150
8 Claims. (Cl. 210—80)

This invention relates to filters and, more particularly, to filters wherein two or more beds are used in approximate relation to each other and wherein each bed contains two or more layers of granular material of different sizes which must be removed and reconditioned from time to time.

A typical example of a filter that is in common use in municipal water supply systems in the United States is the "rapid sand filter."

OPERATION OF RAPID SAND FILTER

Rapid sand filters may be in various sizes. An example of a typical installation of rapid sand filters is a row of filter beds arranged one adjacent the other, each bed being contained in a concrete enclosure, 30 feet long, 28 feet wide, and 8 feet deep. Each filter has a bed of granular material in the bottom of it made up of layers of coarse gravel, medium gravel, and fine gravel. A bed of sand approximately twenty-four inches thick is supported on top of the fine gravel and a layer of granular coal is supported over the sand. A rotary agitator arm, like agitators such as shown in Patent No. 2,309,917, is supported about three inches above the top of the layer of coal in each filter bed.

Water enters the bed through a screen which removes debris and large particles of material. Water flows through the tank from top to bottom and entrained foreign material such as sediment and turbidity is filtered out and accumulates on the top surface of the bed and coats the individual particles of the bed. This foreign material is often slimy and it tenaciously adheres to the individual particles.

After the bed has been in operation for a period of time of length depending upon the percentage and nature of entrained foreign matter in the water, the bed becomes completely clogged and it must be backwashed to remove whatever foreign material possible. During backwashing, the flow of water through the filter material is reversed and the water flows from bottom to top. The sand is lifted from the gravel bed by the backflow or "expanded" and the foreign material that is washed out of the sand flows down the drain.

The effect of backwashing is enhanced by the rotary arm. The high velocity jets from the arm cause a random movement of the media which causes the particles of sand and other filter media to collide with each other. This causes current patterns produced by the jets revolving with the arm which is rotating in a horizontal plane.

The backwash, supplemented by the agitator arm, does not remove all of the entrained foreign material. The amount of this material that is removed is determined by a number of factors, which include the nature of the foreign material and the degree of vigor of the backwash. Some of the foreign material coats the sand particles and cannot be washed off at all during backwash. Therefore, after the bed has been backwashed a number of times even with the rotary arm, further backwash will not recondition the bed satisfactorily and the entire bed must be rejuvenated by removing the granular material and regrading.

MUD BALLS

At times, the filter is clogged by what is known as "mud balls" which form in the bed at local areas. These mud balls are formed by clay and other tenacious material which forms a matrix for the sand. These mud balls grow in size as time progresses as they are not broken up by backwash. Each mud ball blinds the part of the filter it occupies. Ultimately, such mud balls blind such a large percentage of the filter that only local channels of water flow through it.

Flow through the filter is normally at a low rate but as the filter bed becomes "blinded," the flow through the channels increases in velocity because of restriction in area. Dirt and turbidity are carried through the filter and the filtering becomes unsatisfactory. The filter bed must then be regraded.

Once a mud ball forms, it is difficult or impossible to break it up by backwashing. The backwash water flows around the mud ball and as the mud balls grow in size and number, the water flows in channels between the mud balls. These are the same channels through which the water flows in the filtering cycle. The gravel is normally not moved by backwash water but as the backwash water increases, the velocity of the backwash water may become great enough to lift the gravel and mix it with the sand and, also to mix the several layers of gravel.

Where water that is filtered contains industrial wastes and various kinds of clays, these mud balls may become very tenacious and the complete bed has to be regraded.

REGRADING THE FILTER BED

Regrading is at present done manually. Laborers shovel coal, sand, and gravel into a grading screen where the sand is separated from the gravel and the gravel is separated into respective sizes. The sand is then washed by a mechanical washing device to remove the foreign coating materials from the individual grains. The gravel, sand, and coal are then returned to the bed in their proper layers and the bed can then be used through a number of backwash cycles and filtering cycles. Regrading a filter bed, according to present methods which are in use throughout the country, including, for example, in the Erie Water Department with which applicant is familiar, requires about 800 man hours.

The regrading is carried out as follows:
(1) The workers manually shovel the sand and coal into an inductor;
(2) They hand shovel the gravel and send this to a storage pit;
(3) They clean the bottom of the bed;
(4) They prepare the bed for resetting the gravel by cleaning it and reconditioning it;
(5) They hand screen and get the coarse gravel out;
(6) They hand screen the rest of the pile and get the next size of gravel out;
(7) As they proceed, they spread the respective sizes of gravel in the bottom of the bed;
(8) They grade the remainder of the gravel to separate the various sizes therefrom; and
(9) The sand and coal is washed and screened and returned to the bed.

According to this method, the following time is required:

MAN HOURS ESTIMATED TO REGRADE ONE TANK OR FILTER BED

| | Hours |
|---|---|
| To remove sand and coal from ½ bed | 48 |
| To remove gravel from ½ of bed | 48 |
| To clean the bottoms of the beds | 64 |
| To screen the gravel | 128 |
| To reset the gravel | 64 |
| To reset the sand and coal | 40 |
| Total man hours | 392 |

It has been discovered that by carrying out a particular method in handling the regrading and rescreening of a filter bed, time and expense can be saved.

According to the method disclosed herein, the following time table is required to reset a filter bed:

| | Hours |
|---|---|
| Remove, clean, and reset sand and coal from ½ bed | 12 |
| Remove and screen gravel from ½ bed | |
| Clean bottom of bed (old method) | 64 |
| Reset gravel | 64 |
| Total man hours | 140 |

Therefore, it will be seen that the present new method has reduced the man hours for regrading a typical filter bed to less than half that required during the previous method.

THE IMPROVED METHOD

According to the present invention, the inventor can regrade a series of filter beds by pumping the sand, gravel, and coal from the first bed through a grading screen and returning the gravel to the first bed after temporarily storing it. The sand and coal are stored in a remote repository from the first bed. The sand, coal, and gravel from the second bed are then regraded and the sand is pumped from the regrading screen into the first bed while the gravel from the second bed is directed to an adjacent temporary storage repository. When all of the sand, coal, and gravel are removed from the second bed and the second bed is reconditioned, the gravel from the adjacent repository is then returned to the second bed. The sand, coal, and gravel from the third bed are then pumped through the grading screen and the sand is reconditioned and returned to the second filter bed while the gravel from the third bed is directed to the adjacent repository. Then the third filter bed is reconditioned and the gravel from the adjacent repository returned to it.

Therefore, a series of filter beds of indefinite number can be reset by the method disclosed herein with a minimum of handling of the filter material.

It is, accordingly, an object of the present invention to provide an improved method for resetting filter beds.

Another object of the invention is to provide an improved method for regrading and resetting a filter bed which is simple and economical.

A further object of the invention is is to provide an improved method for regrading a series of filter beds.

Figure 2:
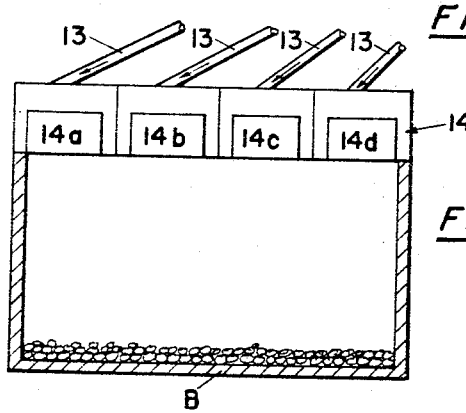

With the above and other objects in view, the invention comprises the method set forth in the specification, drawing, and recited in the appended claims. The invention will be better understood from a reference to the drawing and detailed specification wherein:

FIG. 1 is a diagram of the apparatus for carrying out the method disclosed herein; and FIG. 2 is a diagrammatic view of the apparatus used with the method disclosed herein viewed from a different angle than FIG. 1.

Now with more particular reference to the drawing, a number of filter beds are indicated as filter bed A, second filter bed B, third filter bed C, and additional filter beds may be added.

The filter beds are supported one beside the other and flumes to sewer and for influent water are indicated at 30.

Above the filter beds, the screen apparatus 11 may be supported. This screen apparatus may be supported on a portable vehicle so that it can be moved along the line of filter beds. The screen 11 may be of the conventional type with a plurality of screen elements 31 therein of different sizes to grade out different sizes of gravel and direct then into the adjacent storage bins 14a, 14b, 14c, and 14d. The storage bins 14a, 14b, 14c, and 14d may be supported over the flumes 30 and the adjacent storage bins will have doors 32 and 33, one on each side, so that the bins need only be moved once to fill each of two adjacent filter beds.

The conduit 24 is connected to the pump 25 which provides a path through the conduit 26 to the hopper 10 which in turn directs the coal, sand, and gravel into the screen 11. The pump and conduits, along with the screen, are portable so that they can be moved from bed to bed as the regrading progresses.

Sand and coal passes through the bottom screen 31d and into the eductor 16. The sand at this point may contain too much water and this water may be removed at 34 so that a slurry of sand and water having a lesser percentage of water therein is fed through the conduit 17 from the eductor 16 to the cyclone type washer 18.

The washer 18 may be any of the well known suitable types of washers for reconditioning the sand.

Reconditioned sand and coal from the washer 18 are returned through the conduit 19 to the beds A, B, and C at the proper time or to a remote storage area 20. The remote storage area 20 is shown for purposes of illustration only and this could represent a stockpile outside the filter building or it could be a dump bed or other portable means for conveying the sand from the building.

The process disclosed herein is carried out as follows:

Step I

The sand, coal, and gravel are pumped from bed A through the pump suction conduit 24, pump 25, and pump discharge conduit 26 into hopper 10. The multiple surface screen 11 made up of screen elements 31a, 31b, 31c, and 31d separates the sand and coal from the gravel and directs the coarse gravel, medium gravel, and fine gravel to the adjacent storage bins 14a, 14b, 14c, and 14d, respectively. The sand and coal are directed to the cyclone washer 18.

Graded gravel goes into the chute troughs 13 and into the individual bins 14. The bins 14 are so located that by opening a side door in a later step, gravel is admitted back to the bed from which it was removed.

The filter media, for example, sand, coal, along with water have passed through all of the screens 31a, 31b, 31c, and 31d and dropped into the slump 15. On the bottom of the sump 15 is a water power eductor 16 which forces the filter media and water through the hose or conduit 17 into a washer which may be for example, a centrifugal type cyclone washer 18.

Dirt, clay, sediments, slimes, and other foreign matter are discharged through the conduit 27, which may be a hose or pipe, to a sewer.

Clean filter media leaves the cyclone washer 18 through the conduit 19 and goes into a remote storage area 20. Because of the volume of sand involved, in actual practice, it would be impractical to store the sand adjacent the filter beds, therefore, the bin 20 may be located at a remote storage area from the filter bed. The volume of sand may be as much as fifteen to seventeen cubic yards or more in some filters of the municipal water plant size.

Step II

The under drain system of the filter bed A is then cleaned and serviced. The bed A may then be reset.

RESETTING BED A (1) The door 32 of the gravel bin 14a (large size gravel) is then opened and gravel is admitted to the bed A. Coarse gravel is uniformly and carefully spread to a uniform thickness of suitable depth in accordance with good filter maintenance practice over the bottom of bed A.

The smaller sizes of gravel from bins 14b, 14c, and 14d are then admitted to bed A in sequence to make a filter bed in accordance with good filter maintenance practice.

Sand, coal, and gravel are then pumped from bed B into hopper 10, through the screen 11, and into cyclone washer 18. The gravel goes to the storage bins 14 from the screening arrangement 11 as in Step I. The sand and coal filter media goes through the cyclone washer 18 from the screen 11 and, from thence, it goes to bed A where it is placed on top of the layers of gravel that were reset in Step I.

Since the sand and coal are mixed together, they will remain in this mixed state until the filter bed is first backwashed. This backwash causes the sand and coal to separate from each other because of the differences in density of them, leaving a clear line of demarcation between the sand and the coal.

The bed B is then cleaned and serviced and the under drain serviced.

*Step III*

The gravel is then discharged from the adjacent storage bins 14a, 14b, 14c, and 14d into bed B and reset as above.

The sand, coal, and gravel are then pumped from bed C through the screen 11, eductor 16, into cyclone washer 18. The gravel from bed C is directed to the storage bins 14a, 14b, 14c, and 14d and the sand and coal from bed C, which has now flowed through the cyclone washer 18, is directed to bed B.

This process is continued until all of the beds have been regarded. At the final bed, the sand is brought from the remote storage area 20 and returned to the final bed.

The foregoing specification sets forth the invention in its preferred practical forms but the method disclosed is capable of modification within a range of equivalents without departing from the invention which is to be understood is broadly novel as is commensurate with the appended claims.

The embodiments of the invention in which an exclusive property or privilege is claimed are defined as follows:

1. A method of resetting a plurality of filter beds comprising
   a first filter bed and a second filter bed comprising,
   providing said first filter bed having a first filter material and a second filter material therein,
   providing said second filter bed having a third filter material and a fourth filter material therein,
   removing said first filter material and said second filter material from said first filter bed,
   separating said first filter material from said second filter material,
   placing said first filter material in a remote repository,
   returning said second filter material to said first filter bed,
   removing said third filter material and said fourth filter material from said second filter bed,
   separating said third filter material from said fourth filter material,
   placing said third filter material in said first filter bed,
   replacing said fourth filter material in said second filter bed,
   and replacing filter material like said first filter material in said second filter bed.

2. The method recited in claim 1 wherein
said first filter material is reconditioned before placing it in said remote repository,
and said third filter material is reconditoned before placing it in said first filter bed.

3. The method ected in claim 1 wherein
said first filter bed is cleaned before said second filter material is returned thereto.

4. The method recited in claim 1 wherein
said second filter material is made up of a plurality of different sizes of granular material,
and said different sizes of granular material are separated from each other before returning them to said first filter bed,
and said different sizes of granular material of said second filter material are returned to said first filter bed one after the other in sequence.

5. A method of resetting a plurality of filter beds comprising a first filter bed and a second filter bed comprising
   providing said first filter bed having a first filter material and a second filter material therein,
   providing said second filter bed having a third filter material and a fourth filter material therein,
   said second filter material comprising a first size, a second size, and a third size of granular material,
   said fourth filter material comprising a first size, a second size, and a third size of granular material,
   removing said first filter material and said second filter material from said first filter bed,
   separating said first filter material from said second filter material,
   reconditioning and then placing said first filter material in a remote repository,
   separating said first size, said second size, and said third size of said second filter material from each other,
   storing said first, second, and third sizes of said second filter material in an adjacent repository,
   returning said first size, said second size, and said third size of granular material to said first filter bed,
   removing said third filter material and said fourth filter material from said second filter bed,
   separating said third filter material from said fourth filter material,
   reconditioning and then placing said third filter material in said first filter bed,
   separating said sizes of said fourth filter material from each other,
   returning said sizes of said fourth filter material to said second filter bed, one after the other in sequence,
   and replacing filter material like said first filter material in said second filter bed.

6. The method recited in claim 5 wherein the steps are included of
   providing said adjacent repository with a plurality of bins and locating said adjacent repository between said first filter bed and said second filter bed,
   storing said first, second, and third sizes of said second filter material in said adjacent repository bins.

7. A method of resetting filter beds comprising
   providing a first and a second filter bed each having fine gravel, coarse gravel, medium gravel, sand, and coal therein,
   removing said sand, coal, and gravel from said first filter bed,
   separating said sand and coal from said gravel,
   storing said sand and coal,
   returning said gravel to said first filter bed,
   removing said sand, coal, and gravel from said second filter bed,
   separating said sand and coal from said second filter bed,
   placing said sand and coal from said second filter bed in said first filter bed,
   returning said gravel to said second filter bed,
   and placing sand and coal in said second filter bed.

8. The method recited in claim 7 wherein
said fine, medium, and coarse gravel are separated from each other before returning them to said filter beds.

References Cited
UNITED STATES PATENTS

| | | | |
|---|---|---|---|
| 2,744,840 | 5/1956 | Daniels et al. | 210—189 X |
| 3,072,567 | 1/1963 | Evans et al. | 210—33 X |

REUBEN FRIEDMAN, *Primary Examiner.*

D. M. RIESS, *Assistant Examiner.*